US009860835B2

(12) United States Patent
Cho et al.

(10) Patent No.: US 9,860,835 B2
(45) Date of Patent: Jan. 2, 2018

(54) METHOD FOR CELL SELECTION IN MULTI-RAT ENVIRONMENT

(71) Applicant: LG ELECTRONICS INC., Seoul (KR)

(72) Inventors: Heejeong Cho, Seoul (KR); Hyunsoo Ko, Seoul (KR); Eunjong Lee, Seoul (KR); Sunam Kim, Seoul (KR); Hyeyoung Choi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 14/916,968

(22) PCT Filed: Aug. 27, 2014

(86) PCT No.: PCT/KR2014/007958
§ 371 (c)(1),
(2) Date: Mar. 4, 2016

(87) PCT Pub. No.: WO2015/034202
PCT Pub. Date: Mar. 12, 2015

(65) Prior Publication Data
US 2016/0219504 A1    Jul. 28, 2016

Related U.S. Application Data

(60) Provisional application No. 61/873,799, filed on Sep. 4, 2013, provisional application No. 61/890,325, filed
(Continued)

(51) Int. Cl.
*H04W 4/00*    (2009.01)
*H04W 48/20*    (2009.01)
(Continued)

(52) U.S. Cl.
CPC .......... *H04W 48/20* (2013.01); *H04W 48/16* (2013.01); *H04W 52/242* (2013.01);
(Continued)

(58) Field of Classification Search
CPC ............. H04W 84/045; H04W 52/242; H04W 52/325; H04W 48/20; H04W 48/16; H04W 88/06
See application file for complete search history.

(56) References Cited

U.S. PATENT DOCUMENTS 6,539,233 B1 *    3/2003    Taketsugu ............. H04W 52/50
                                                    455/436
2004/0023693 A1 *    2/2004    Okawa .................. H04W 36/12
                                                    455/562.1
(Continued)

FOREIGN PATENT DOCUMENTS

KR    1020030004968 A    1/2003
KR    1020070042550 A    4/2007
(Continued)

OTHER PUBLICATIONS

PCT International Application No. PCT/KR2014/007958, International Search Report dated Dec. 1, 2014, 1 page.

*Primary Examiner* — Ricky Ngo
*Assistant Examiner* — Phong La
(74) *Attorney, Agent, or Firm* — Lee, Hong, Degerman, Kang & Waimey (57) ABSTRACT

The present invention provides a method for selecting a cell by a terminal which is capable of establishing a radio connection through a plurality of radio interfaces. The terminal comprises a signal transmitting/receiving unit and a processor connected to the signal transmitting/receiving unit. The processor may receive, from a base station, system information about pilot transmission power and an uplink reception power limit, estimate the amount of path loss on
(Continued)

the basis of the pilot transmission power and measured pilot reception power, and determine whether to connect to the base station on the basis of the uplink reception power limit and the amount of path loss.

6 Claims, 12 Drawing Sheets

Related U.S. Application Data on Oct. 14, 2013, provisional application No. 61/896,641, filed on Oct. 28, 2013, provisional application No. 61/900,402, filed on Nov. 6, 2013.

(51) Int. Cl.
*H04W 48/16* (2009.01)
*H04W 52/24* (2009.01)
*H04W 52/32* (2009.01)
*H04W 84/04* (2009.01)
*H04W 88/06* (2009.01)

(52) U.S. Cl.
CPC ........ *H04W 52/325* (2013.01); *H04W 84/045* (2013.01); *H04W 88/06* (2013.01)

(56) References Cited

U.S. PATENT DOCUMENTS

| | | | |
|---|---|---|---|
| 2004/0203782 A1* | 10/2004 | Peng | H04W 36/18 455/436 |
| 2005/0250528 A1* | 11/2005 | Song | H04W 52/325 455/522 |
| 2008/0130588 A1* | 6/2008 | Jeong | H04W 74/002 370/335 |
| 2010/0144317 A1* | 6/2010 | Jung | H04W 48/20 455/411 |
| 2010/0232327 A1* | 9/2010 | Kim | H04W 36/36 370/311 |
| 2011/0216732 A1* | 9/2011 | Maeda | H04W 4/08 370/329 |
| 2011/0255486 A1* | 10/2011 | Luo | H04W 48/12 370/329 |
| 2011/0275361 A1* | 11/2011 | Yavuz | H04W 52/143 455/422.1 |
| 2012/0039195 A1* | 2/2012 | Jung | H04W 36/32 370/252 |
| 2012/0188897 A1* | 7/2012 | Shen | H04W 52/146 370/252 |
| 2012/0236776 A1* | 9/2012 | Zhang | H04W 48/12 370/312 |
| 2013/0003590 A1* | 1/2013 | Gage | H04W 52/244 370/252 |
| 2013/0176866 A1* | 7/2013 | Yang | H04W 36/0055 370/252 |
| 2013/0223235 A1* | 8/2013 | Hu | H04W 36/04 370/242 |
| 2014/0112179 A1* | 4/2014 | Muraoka | H04W 24/02 370/252 |
| 2014/0295836 A1* | 10/2014 | Frenger | H04W 74/006 455/434 |
| 2015/0124673 A1* | 5/2015 | Ouchi | H04W 52/146 370/311 |

FOREIGN PATENT DOCUMENTS

| | | |
|---|---|---|
| KR | 1020080037628 A | 4/2008 |
| KR | 1020120099721 A | 9/2012 |

* cited by examiner

METHOD FOR CELL SELECTION IN MULTI-RAT ENVIRONMENT

CROSS-REFERENCE TO RELATED APPLICATIONS

This application is the National Stage filing under 35 U.S.C. 371 of International Application No. PCT/KR2014/007958, filed on Aug. 27, 2014, which claims the benefit of U.S. Provisional Application No. 61/873,799, filed on Sep. 4, 2013, 61/890,325, filed on Oct. 14, 2013, 61/896,641, filed on Oct. 28, 2013, and 61/900,402, filed on Nov. 6, 2013, the contents of which are all hereby incorporated by reference herein in their entirety.

BACKGROUND OF THE INVENTION

Field of the Invention

The present invention relates to wireless communications, and more particularly, to a method for selecting a cell in a communication environment in which a plurality of wireless networks is supported.

Related Art

3rd generation partnership project (3GPP) long term evolution (LTE) is an improved version of a universal mobile telecommunication system (UMTS) and is introduced as the 3GPP release 8. The 3GPP LTE uses orthogonal frequency division multiple access (OFDMA) in a downlink, and uses single carrier-frequency division multiple access (SC-FDMA) in an uplink. The 3GPP LTE employs multiple input multiple output (MIMO) having up to four antennas. The 3GPP LTE adopts MIMO (multiple input multiple output) having maximum four antennas. In recent years, there is an ongoing discussion on 3GPP LTE-advanced (LTE-A) that is an evolution of the 3GPP LTE.

Figure 1:
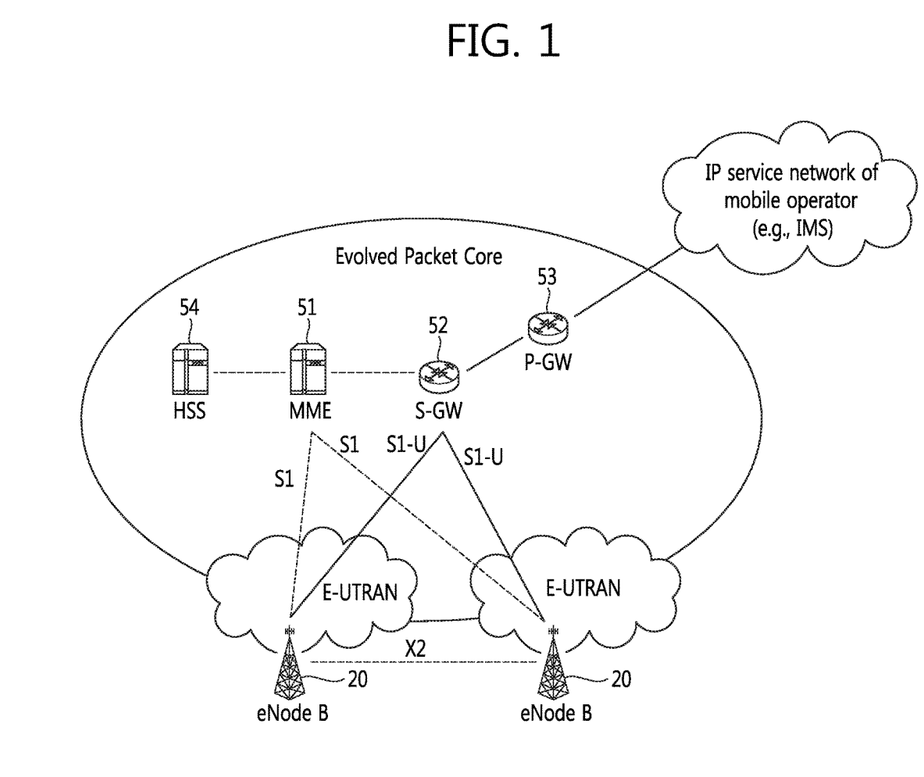
FIG. 1 is a schematic diagram illustrating a structure of evolved mobile communication network.

FIG. 1 is a schematic diagram illustrating a structure of evolved mobile communication network.

As shown in FIG. 1, an evolved UMTS terrestrial radio access network (E-UTRAN) is connected to an evolved packet core (EPC).

The E-UTRAN includes base stations (or eNodeBs) 20 that provides a control plane and a user plane to a user equipment (UE). The base stations (or eNodeBs) 20 may be interconnected through an X2 interface.

The radio interface protocol layers between the UE and the base station (or eNodeB) 20 may be divided by L1 (a first layer), L2 (a second layer) and L3 (a third layer) based on lower three layers of open system interconnection (OSI) standard model that is widely known in communication systems. Among these layers, a physical layer included in the first layer provides an information transfer service using a physical channel, and a radio resource control (RRC) layer located at the third layer performs a role of controlling radio resources between the UE and the base station. For this, the RRC layer exchanges a RRC message between the UE and the base station.

Meanwhile, the EPC may include various elements. FIG. 1 shows a mobility management entity (MME) 51, a serving gateway (S-GW) 52, a packet data network gateway (PDN GW) 53 and a home subscriber server (HSS) 54 among the various elements.

The base station (or eNodeB) 20 is connected to the mobility management entity (MME) 51 of the EPC through an S1 interface, and is connected to the serving gateway (S-GW) 52 through an S1-U.

The S-GW 52 is an element that operates at a boundary point between a radio access network (RAN) and a core network and has a function of maintaining a data path between an eNodeB 20 and the PDN GW 53. Furthermore, if a user equipment (UE) moves in a region in which service is provided by the eNodeB 20, the S-GW 52 plays a role of a local mobility anchor point. That is, for mobility within an E-UTRAN (universal mobile telecommunications system (Evolved-UMTS) terrestrial radio access network defined after 3GPP release-8), packets can be routed through the S-GW 52. Furthermore, the S-GW 52 may play a role of an anchor point for mobility with another 3GPP network (i.e., a RAN defined prior to 3GPP release-8, for example, a UTRAN or global system for mobile communication (GSM) (GERAN)/enhanced data rates for global evolution (EDGE) radio access network).

The PDN GW (or P-GW) 53 corresponds to the termination point of a data interface toward a packet data network. The PDN GW 53 can support policy enforcement features, packet filtering, charging support, etc. Furthermore, the PDN GW (or P-GW) 53 can play a role of an anchor point for mobility management with a 3GPP network and a non-3GPP network (e.g., an unreliable network, such as an interworking wireless local area network (I-WLAN), a Code Division Multiple Access (CDMA) network, or a reliable network, such as WiMax).

In the network configuration of FIG. 1, the S-GW 52 and the PDN GW 53 have been illustrated as being separate gateways, but the two gateways may be implemented in accordance with a single gateway configuration option.

The MME 51 is an element for performing the access of a terminal to a network connection and signaling and control functions for supporting the allocation, tracking, paging, roaming, handover, etc. of network resources. The MME 51 controls control plane functions related to subscribers and session management. The MME 51 manages numerous eNodeBs 22 and performs conventional signaling for selecting a gateway for handover to another 2G/3G networks. Furthermore, the MME 51 performs functions, such as security procedures, terminal-to-network session handling, and idle terminal location management.

Meanwhile, recently, the high speed data traffic has been rapidly increased. In order to meet such traffic increase, technologies have been introduced for offloading the traffic of UE to WLAN (Wi-Fi) or a small cell.

Figure 2:
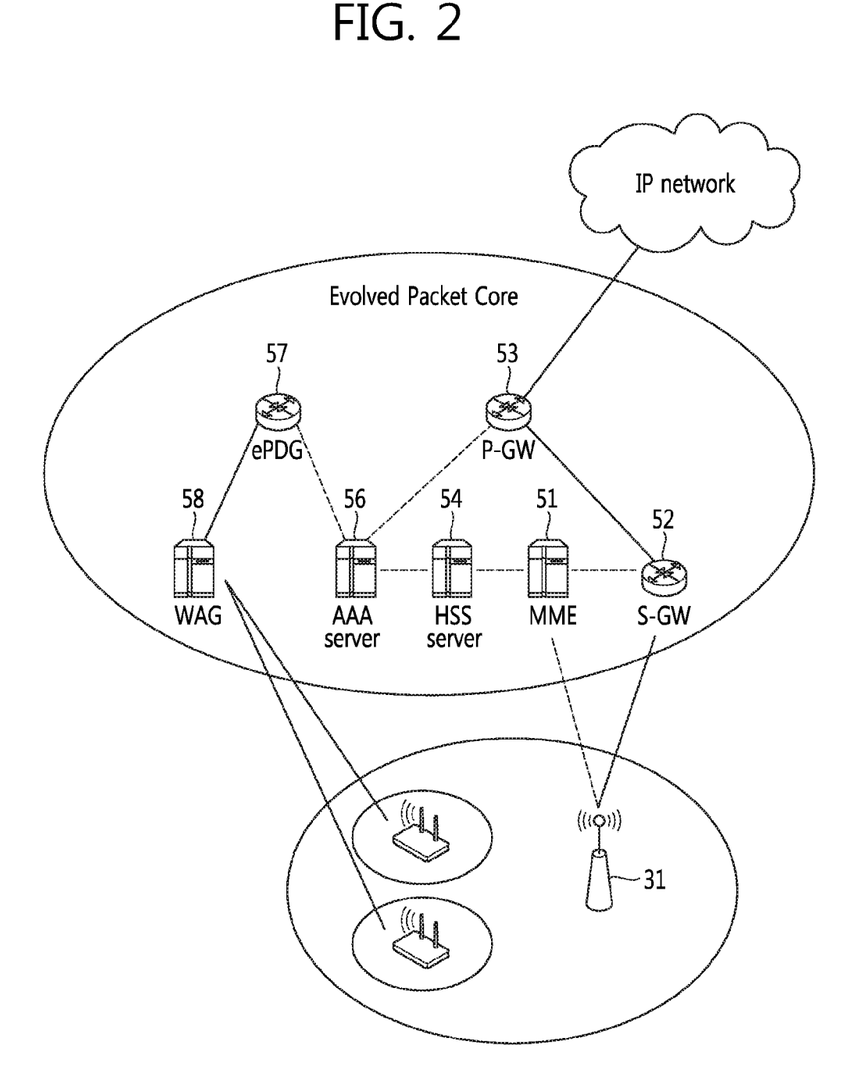
FIG. 2 is a schematic diagram illustrating a network structure to which a small cell or a WLAN AP is added.

FIG. 2 is a schematic diagram illustrating a network structure to which a small cell or a WLAN AP is added.

Referring to FIG. 2, within the coverage of a base station 31 for the small cell, a plurality of WLAN AP may be arranged. That is, several radio access technologies (RATs) are existed around a UE. Accordingly, the UE may distribute data traffic into the several RATs. The base station 31 for small cell may be arranged within the coverage of a macro base station such as the existing eNodeB.

As known from by reference to FIG. 2, the P-GW 53 and the HSS 54 are connected to an access authentication authorization (AAA) server 56. The P-GW 53 and the AAA server 56 may be connected to an evolved packet data gateway (ePDG) 57. The ePDG 57 plays a role of a security node for not being trusted non-3GPP network (e.g., WLAN or Wi-Fi, etc.). The ePDG 57 may be connected to a WLAN access gateway (WAG) 58. The WAG 58 may be in charge of a role of P-GW in Wi-Fi system.

As such, as the existing mobile communication network is associated with a hetero network, a discussion is required for selecting an optimal wireless network for performing a specific operation.

SUMMARY OF THE INVENTION

An object of the present invention is to provide a method for selecting a cell by a user equipment in a communication environment in which uplink coverage and downlink coverage are asymmetric.

Another object of the present invention is to provide a method for signaling the information transmitted for selecting a cell in a multi-RAT environment.

A user equipment according to an embodiment of the present invention may include a signal transmitting and receiving unit, and a processor connected to the signal transmitting and receiving unit, the processor is configured to perform: receiving system information on a pilot transmission power and a permissible uplink reception power from the base station, estimating an amount of path loss based on the pilot transmission power and a measured pilot reception power, and determining whether to access to the base station based on the permissible uplink reception power and the amount of path loss.

The processor may determine to access to the base station in case that a value of a maximum transmission power subtracted by the amount of path loss is greater than the permissible uplink reception power.

The processor may access to the base station if it is determined to access the base station, and may receive system information from a wireless node which is different from the base station, if it is determined not to access the base station.

The processor may receive the system information from the wireless node which is different from the base station for a cellular access, and may receive system information from a wireless node for a Wi-Fi access.

Advantageous Effects

According to the present invention, a method for selecting a cell by a user equipment in a communication environment in which uplink coverage and downlink coverage are asymmetric is provided.

According to an embodiment of the present invention, a method for signaling the information transmitted for selecting a cell in a multi-RAT environment is provided.

BRIEF DESCRIPTION OF THE DRAWINGS

FIG. 4a to FIG. 4d are a conceptual diagram illustrating a construction of radio entity (RE) that manages a base station and a WLAN AP integrally for a multi-RAT UE according to the present invention.

DESCRIPTION OF EXEMPLARY EMBODIMENTS

A wireless device may be fixed and may have mobility, and may be referred to as other terms such as user equipment (UE), MS (mobile station), UT (user terminal), SS (subscriber station), and MT (mobile terminal). In general, a base station (BS) refers to a fixed station communicating with the wireless device, and may be referred to as other terms such as eNB (evolved-NodeB), BTS (base transceiver system), and access point (AP).

The following description will be made where the present invention is applied based on 3GPP (3rd Generation Partnership Project) 3GPP LTE (long term evolution) or 3GPP LTE-A (LTE-Advanced). This is illustrative purpose only and the present invention is applicable to various wireless communication networks. Hereinafter, the LTE includes LTE and/or LTE-A.

The present specification is described targeted to a communication network, and tasks performed in the communication network may be performed during controlling network by a system (e.g., a BS) that controls the corresponding communication network or performed by a UE which is linked to the corresponding network.

Figure 3:
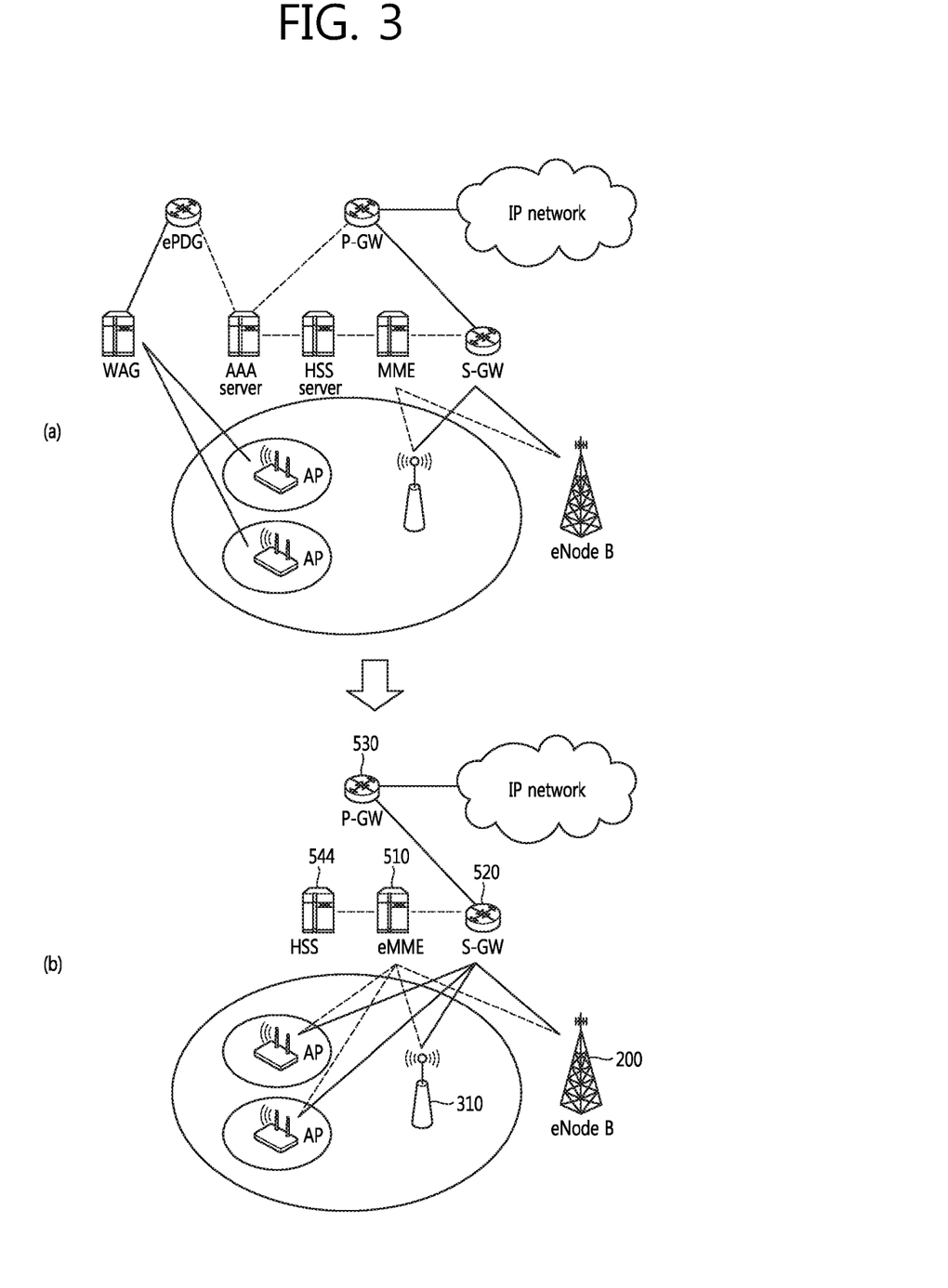
FIG. 3 is a diagram illustrating an example by comparing the existing mobile communication network structure and a network structure improved according to the present invention.

FIG. 3 is a diagram illustrating an example by comparing the existing mobile communication network structure and a network structure improved according to the present invention.

In comparison with the existing mobile communication network structure shown in FIG. 3 (a), an enhanced MME (eMME) 510 and an enhanced GW (eGW) 520 may be included according to the improved network structure shown in FIG. 3 (b). Although it is depicted that the eMME 510 and the eGW 520 are separated in FIG. 3 (b), the eMME 510 and the eGW 520 may be separated only in logical manner, but combined in a device in physical manner. In addition, although it is depicted that the eGW 520 and a P-GW 530 are separated in FIG. 3 (b), the eGW 520 and the P-GW 530 may be combined in a device.

The eMME 510 may be connected to a WLAN access point (AP) as well as an eNodeB 200 and a BS 310. For this, a new interface may be added between the eMME 510 and the WLAN AP. Similarly, the eGW 520 may be connected to the WLAN access point (AP) as well as the eNodeB 200 and the BS 310. For this, a new interface may be added between the eGW 520 and the WLAN AP.

The UE shown in FIG. 3 may perform a wireless connection through radio interfaces different from each other, and such a wireless connection may be managed by a RE or a specific wireless node. In addition, through a specific wireless node, an interface may be generated according to a non access stratum (NAS) protocol between a UE and a core network.

Such a radio interface may include 2G, 3G, 4G, 5G, Wi-Fi, WiMAX, LTE, and so on as well as the Wi-Fi interface shown in FIG. 3. In more particular, in case that a UE is existed indoors, an accessible radio interface includes 3G, 4G, 5G, Wi-Fi, and so on. In case that a UE is existed outdoors, an accessible radio interface includes 3G, 4G, 5G, and so on.

Meanwhile, if a specific cycle or a tracking area code (TAC) of its own is different from a TAC received from a wireless node such as a BS or a WLAN AP, a UE performs a tracking area update (TAU) and transmits and receives paging information.

As such, when transmitting/receiving the TAU and the paging information, the UE may determine one of a plurality of RATs to be an optimal RAT depending on a radio environment or a specific condition, perform the tracking area update (TAU) through the determined RAT, and transmit and receive the paging information.

FIG. 4a to FIG. 4d are a conceptual diagram illustrating a construction of radio entity (RE) that manages a BS and a WLAN AP integrally for a multi-RAT UE according to the present invention.

First, a radio entity (RE; or radio access device) 300 is a newly introduced device according to the present invention, and makes the management of the BS 310 and the WLAN AP 320 more easy in order to strengthen a support of the multi-RAT UE 100. Such a RE has various types according to the present invention.

Figure 4A:
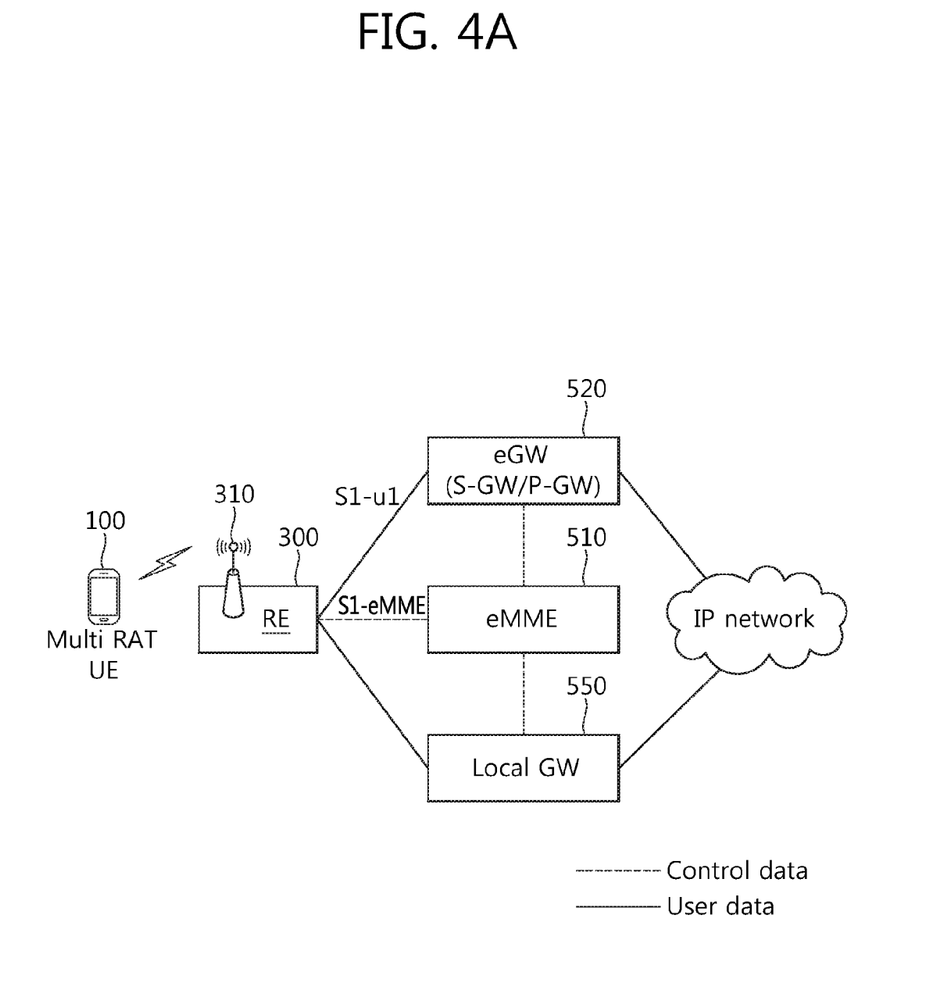

FIG. 4a illustrates a concept of RE according to a first type, and the RE 300 according to the first type supports only the cellular BS 310. At the moment, the RE 300 of the first type may be integrated within the cellular BS 310. The RE 300 of the first type is connected to an eGW 520 and a local GW 550 for the transmission and reception of user data, and connected to an eMME 510 for the transmission and reception of control data. The eGW 520 may perform one or more function of the S-GW and the P-GW. The local GW 550 is a gateway that enables the RE to access to a home network of a home or an office.

The multi-RAT UE 100 and the RE 300 may be connected through an access stratum (AS) protocol, and the multi-RAT UE 100 and the eMME 510 may be connected through a non access stratum (NAS) protocol which is an interface between a UE and a core network.

As shown in FIG. 4a, an interface called S1-eMME may be formed between the RE 300 and the eMME 510, and an interface called S1-U1 may be formed between the RE 300 and the eGW 520.

Figure 4B:
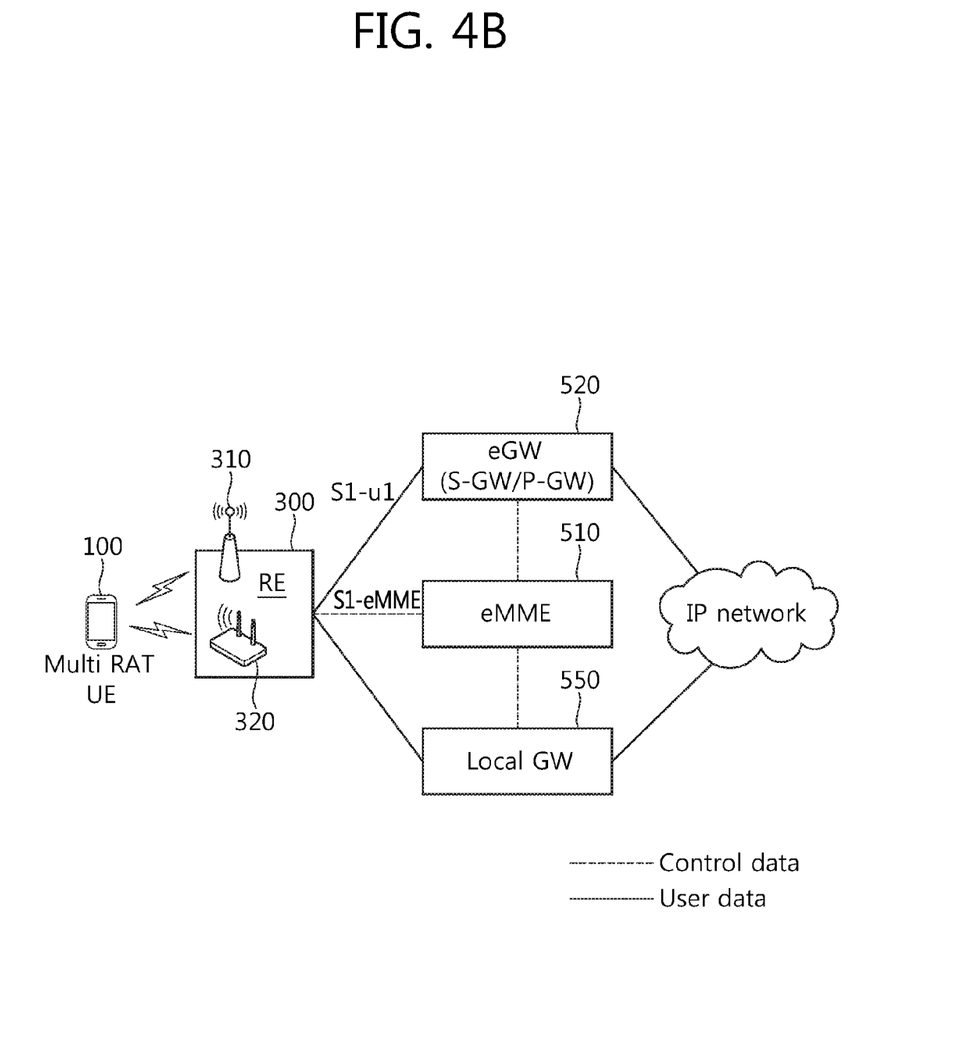

FIG. 4b illustrates a concept of RE according to a second type, and the RE 300 according to the second type supports both the cellular BS 310 and the WLAN AP 320. At the moment, the RE 300 according to the second type may be a device that integrates the cellular BS 310 and the WLAN AP 320.

According to FIG. 4b, the multi-RAT RE 100 may be connected to the RE 300 through at least one of the cellular link or the Wi-Fi link.

Figure 4C:
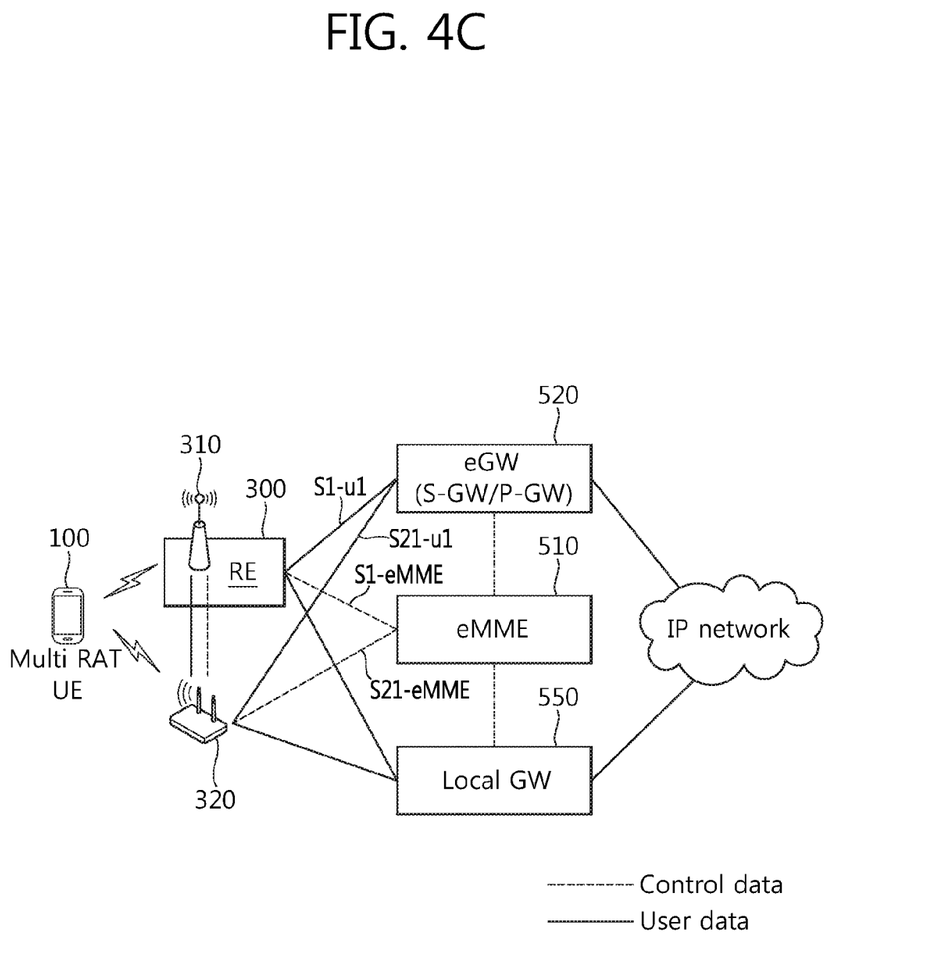

FIG. 4c illustrates a concept of RE according to a third type, and the RE 300 according to the third type is integrated within the cellular BS 310. However, there exists an interface between the RE according to the third type and the WLAN AP 320.

As shown in FIG. 4c, an interface called S21-U1 may be formed between the WLAN AP 320 and the eGW 520, and an interface called S21-eMME may be formed between the WLAN AP 320 and the eMME 510.

According to FIG. 4c, in case that the multi-RAT UE 100 is available to communicate through the Wi-Fi link, a UE may directly access to a core network through the WLAN AP 320, and access to the core network via the RE 300 by using an interface between the WLAN AP 320 and the RE 300.

In case of the RE 300 according to the third type, even though the multi-RAT UE 100 is connected to the WLAN AP 320 through the Wi-Fi link, the RE 300 may be a subject to manage the connection between the WLAN AP 320 and the core network.

Figure 4D:
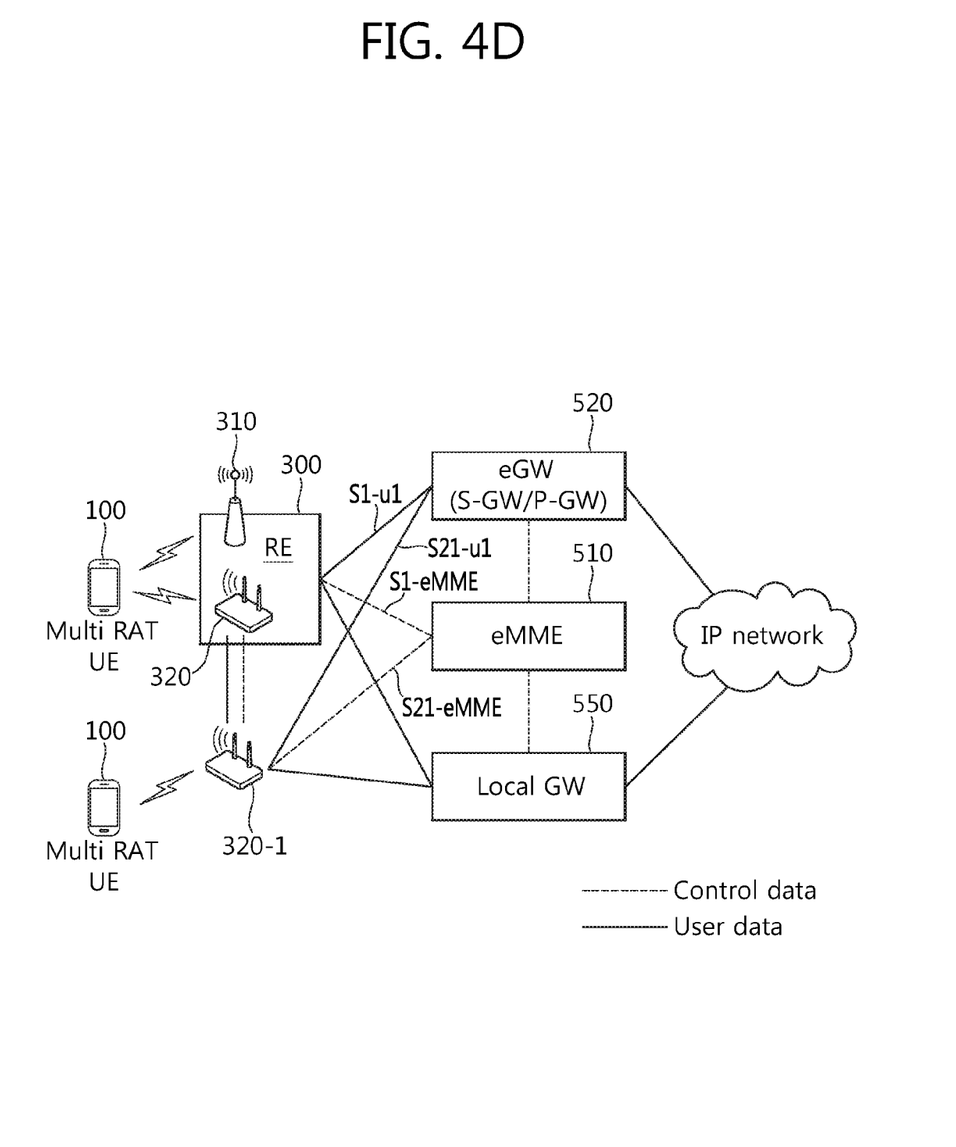

FIG. 4d illustrates a concept of RE according to a fourth type, and the RE according to the fourth type has a concept that the RE according to the second type and the RE according to the third type are mixed. That is, the RE 300 according to the fourth type is a device that integrates the cellular BS 310 and the WLAN 320. And an interface may be additionally existed between the RE according to the fourth type and an external WLAN AP 320-1.

The multi-RAT UE 100 may access to the core network by being connected to the RE 300 through at least one of the cellular link or the Wi-Fi link, and access to the core network through the WLAN 320 in case that the multi-RAT UE is available to communicate through the Wi-Fi link. Or, as described for the third type, the multi-RAT UE 100 may access to the core network via the RE 300 by using an interface between the WLAN AP 320 and the RE 300.

As such, REs of various types may be existed, and the WLAN AP may be collocated with the RE or may be existed with being connected to the RE.

Figure 5:
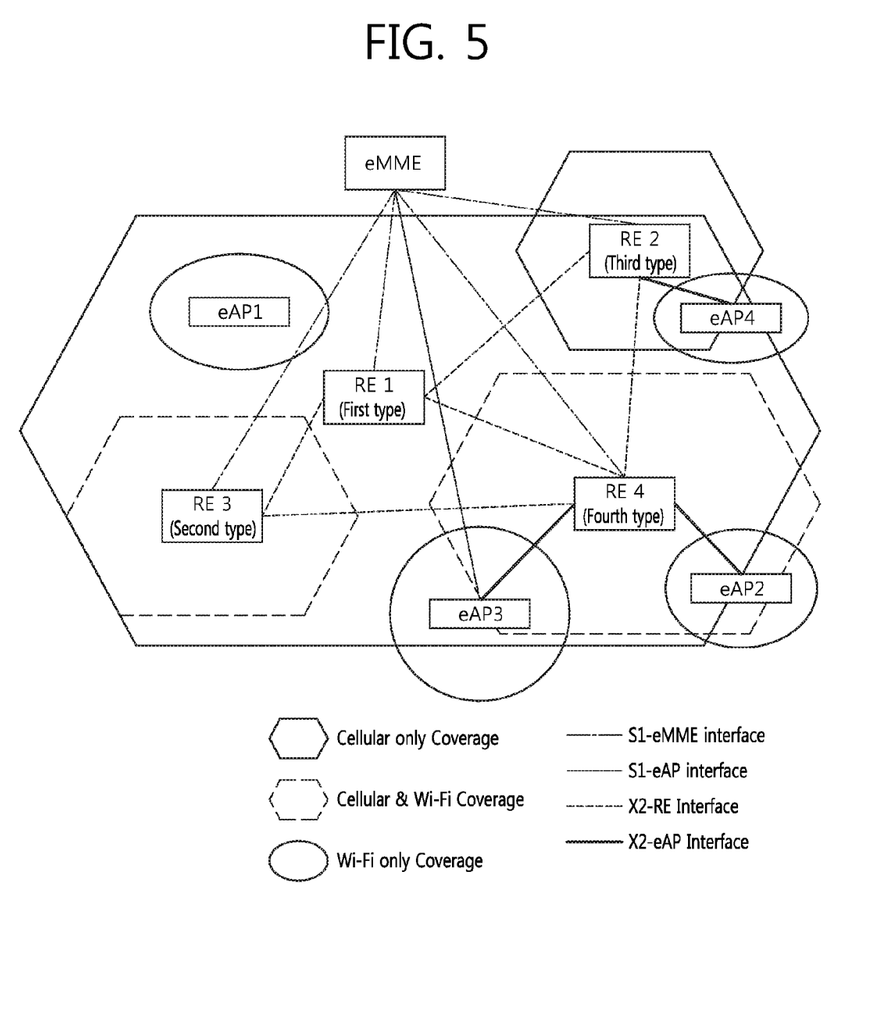
FIG. 5 is a diagram illustrating coverage of different wireless networks according to an embodiment of the present invention.

FIG. 5 is a diagram illustrating coverage of different wireless networks according to an embodiment of the present invention.

Referring to FIG. 5, an eMME forms an S1-eMME interface with four REs (RE 1, RE 2, RE3 and RE 4), and also forms an interface with an eAP 3 that may correspond to the WLAN AP of FIG. 4.

The RE 1 corresponds to the RE of the first type that provides only the cellular interface, and the RE 2 corresponds to the RE of the second type that forms an X2-eAP interface with being connected to an eAP 4 through the cellular interface.

The RE 3 is a wireless node that supports the cellular interface and the Wi-Fi interface, and corresponds to the third type.

The RE 4 corresponds to the fourth type that forms an interface with being connected to the eAP 3 and the eAP 4 and is also a wireless note that supports the cellular interface and the Wi-Fi interface.

Each of the eAP 1 to the eAP 4 forms Wi-Fi coverage area unilaterally, and the eAP 2 to the eAP 4 forms the X2-AP interface with RE 2 and RE 4, respectively, Since eAP 3 also forms an S1-dAP interface with the eMME, the eAP 3 is connected to a core network.

Between REs, an X2-RE interface may be formed.

Although it is shown that the sizes of the cellular coverage and the Wi-Fi coverage formed by the RE 3 and the RE 4 are the same for the convenience of description, the sizes may be either the same or different.

As such, in the different RAT environments, a UE may select a radio interface which is proper to its situation, that is, the UE may select a cell for wireless communication. Particularly, asymmetric uplink/downlink coverage may be formed owing to capability differences in data transmission and reception between a UE and a RE, and in this case, it is required to newly define system information (hereinafter, SI) for a UE to select a cell.

Such SI may be transmitted to a UE by a RE that forms the cellular interface with the UE through master information block (MIB), system information 1 (SIB 1), system information 2 (SIB 2), and so on. Or, the SI may be transmitted to a UE by an eAP that forms the Wi-Fi interface with the UE through a beacon or a probe.

The SI may include essential multi-radio SI contents and additional multi-radio SI contents. The additional multi-radio SI contents may be transmitted through SIB x or neighbor advertisement.

The essential multi-radio SI contents represent the system information that a UE consider when selecting a cell regardless of radio layer state (e.g., idle state and connected state) of the UE. The cell to be selected may include a target cell in the handover.

The SI transmitted to a UE may include type information of RE shown in FIG. 4.

The first type may represent a RE that provides only the cellular interface, which is the concept including the existing cellular BS, and the second type may represent a RE in which the cellular interface and the Wi-Fi interface are physically collocated (physically collocated multi-RAT radio entity).

The third type may represent a RE in which the cellular interface and the Wi-Fi interface are physically connected (physically connected multi-RAT radio entity), and the fourth type may represent a RE in which the second type and the third type are combined (hybrid multi-RAT radio entity).

In addition, the SI may include information of mobility capacity of RE. For example, type 0 may represent a fixed RE and type 1 may represent a moving RE.

Furthermore, the SI transmitted to a UE is the SI transmitted through a beacon by an eAP as well as a RE that supports the cellular interface, and may include a multi-radio integration support level value that may mean a cellular/Wi-Fi simultaneous transmission level supported by the eAP.

The multi-radio integration support level value for the cellular/Wi-Fi simultaneous transmission level supported by a RE may include None, Layer 3 (IP level) only, Layer 2 (Link level) only, Both, and so on.

For example, in case that a link level simultaneous transmission service is served to a UE from a specific RE and an eAP, when the UE selects a target cell to handover, the UE may preferentially select a cell of which level value is "Level 2 (link level) only" or "Both") using the multi-radio integration support level.

The additional multi-radio SI contents may include a first Wi-Fi configuration information (served Wi-Fi AP configuration) for one or more Wi-Fi networks (eAP connected or collocated to a RE) that the corresponding RE manages and a second Wi-Fi configuration information (neighbor Wi-Fi AP configuration) for one or more Wi-Fi networks that a neighbor RE manages.

For example, in case of RE 4 of FIG. 5, the Wi-Fi network information on one eAP which is collocated and two eAP (eAP 2 and eAP 3) which are connected may be included in the first Wi-Fi configuration information.

In addition, the Wi-Fi network information on the eAP 4 of RE 2 or the RE 3 may be included in the second Wi-Fi configuration information.

The first Wi-Fi configuration information may include a number of collocated Wi-Fi interface, a number of connected Wi-Fi interface, an eAP index, an eAP IP address, an eAP identifier (SSID, BSSID and HESSID), Public, Private, Personal, a frequency channel (operating class and channel number), beacon related information (e.g., beacon interval), eAP load, interference information, power (power on/off and power level), an eAP indicator (eAP barring indicator) indicating whether to access, eAP mobility capability (fixed/mobile), an evolved connection management (ECM) & an evolved mobility management (EMM) indicator for indicating whether to perform ECM/EMM related function through a Wi-Fi AP (e.g., attachment, tracking area update), a multi-radio integration support level, and so on.

The second Wi-Fi configuration information may include information on an eAP which is included in the first Wi-Fi configuration information such as a neighbor RE identifier coupled with each Wi-Fi interface, Wi-Fi eAP type information (Legacy AP, Physically collocated AP with RE, Physically connected AP to RE, Hybrid AP), an eAP index, an eAP IP address, an AP identifier (SSID, BSSID and HESSID), and so on.

Meanwhile, as described above, asymmetric uplink/downlink coverage may be differently formed owing to the differences of data transmission/reception capability of a UE and a RE. Hereinafter, in such a case, a method for selecting a cell by a UE will be described.

Figure 6:
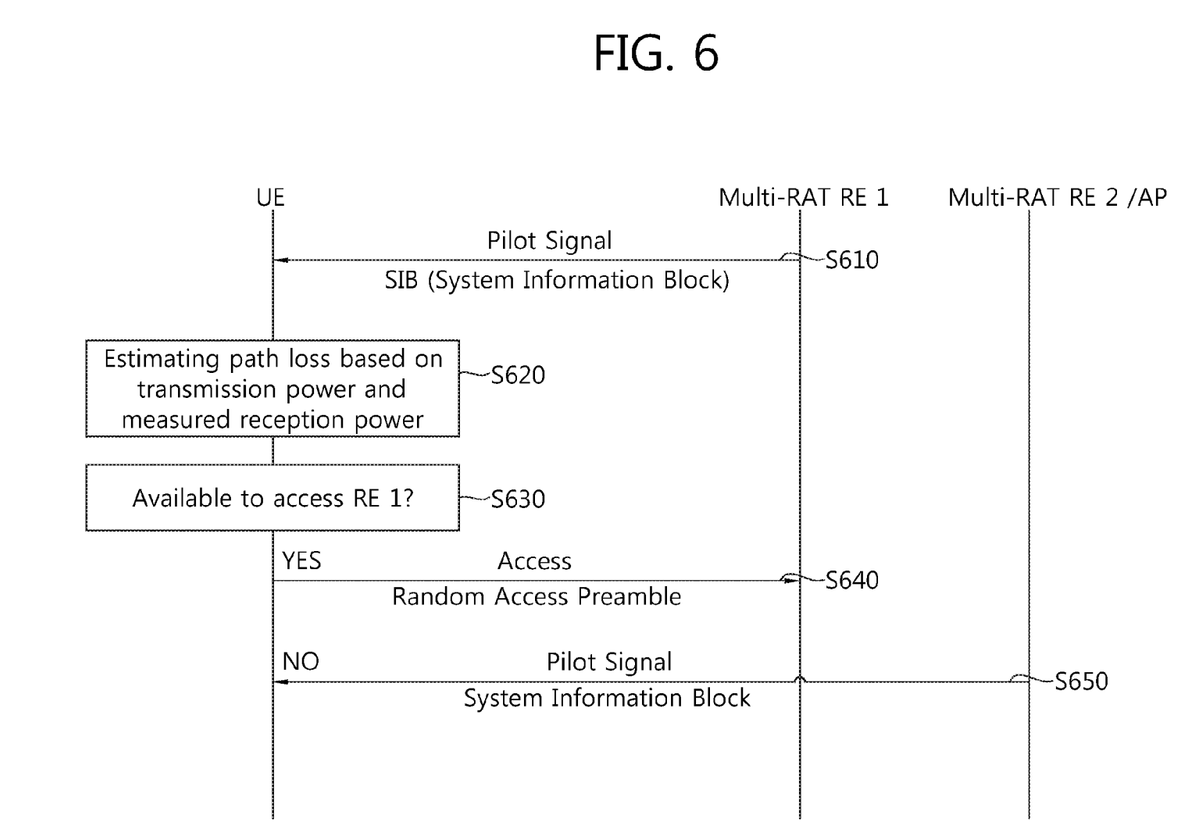
FIG. 6 is a control flowchart for describing a method for selecting a cell by a UE according to an embodiment of the present invention.

FIG. 6 is a control flowchart for describing a method for selecting a cell by a UE according to an embodiment of the present invention.

According to the embodiment, in case that an upload link is not properly established between a UE and a BS since uplink coverage is smaller than downlink coverage, or sever interference occurs although there is no problem in uploading data, the UE may select another wireless node for uplink.

First, the UE may receive system information on pilot transmission power and permissible uplink reception power from the BS, which is one of multi-RAT RE (step, S610).

The BS is a wireless node that provides a cellular access, and the BS transmits system information block that includes the transmission power of pilot signal, the permissible uplink reception power, and so on, to the UE.

The pilot transmission power may be, for example, a cell-specific reference signal in LTE or a preamble mentioned in IEEE 802.16m.

The permissible uplink reception power may represent an uplink minimum reception level [dBm] (UL-RxLevMin) or a quality level [dB] which is required for the UE to access the corresponding BS (cell).

The UE may estimate an amount of path loss based on the received pilot transmission power and a measured pilot reception power (e.g., reference signal reception power in LTE) (step, S620).

When the amount of path loss is estimated, the UE may determine whether to access the BS based on the permissible uplink reception power and the amount of path loss (step, S630).

If the value of a maximum transmission power subtracted by the amount of path loss is greater than the permissible uplink reception power, the UE may determine to access the corresponding BS.

At the moment, the maximum transmission power may be selected as a smaller value between a UE-specific maximum transmission power and a maximum transmission power (p-Max) permissible to the UE (maximum transmission power=min [UE-specific maximum transmission power, p-Max]). The maximum transmission power permissible to the UE is a parameter determined by a BS, and such information (DL-TxPower) may also be transmitted with being included in the SI.

If it is determined that radio access to the current BS, that is, the RE 1 is available, the UE performs a radio access to the corresponding BS (step, S640), and if it is determined not to access the BS, the UE may receive the SI from other wireless node which is different from the BS (step, S650).

The process that the UE acquires the system information on another BS or hetero wireless node and accesses for selecting other wireless node may be expressed by a redirection.

The UE may receive system information from other wireless node that is different from the BS from which the UE receives a pilot signal for the redirection, and may receive system information from a wireless node for Wi-Fi access.

Figure 7:
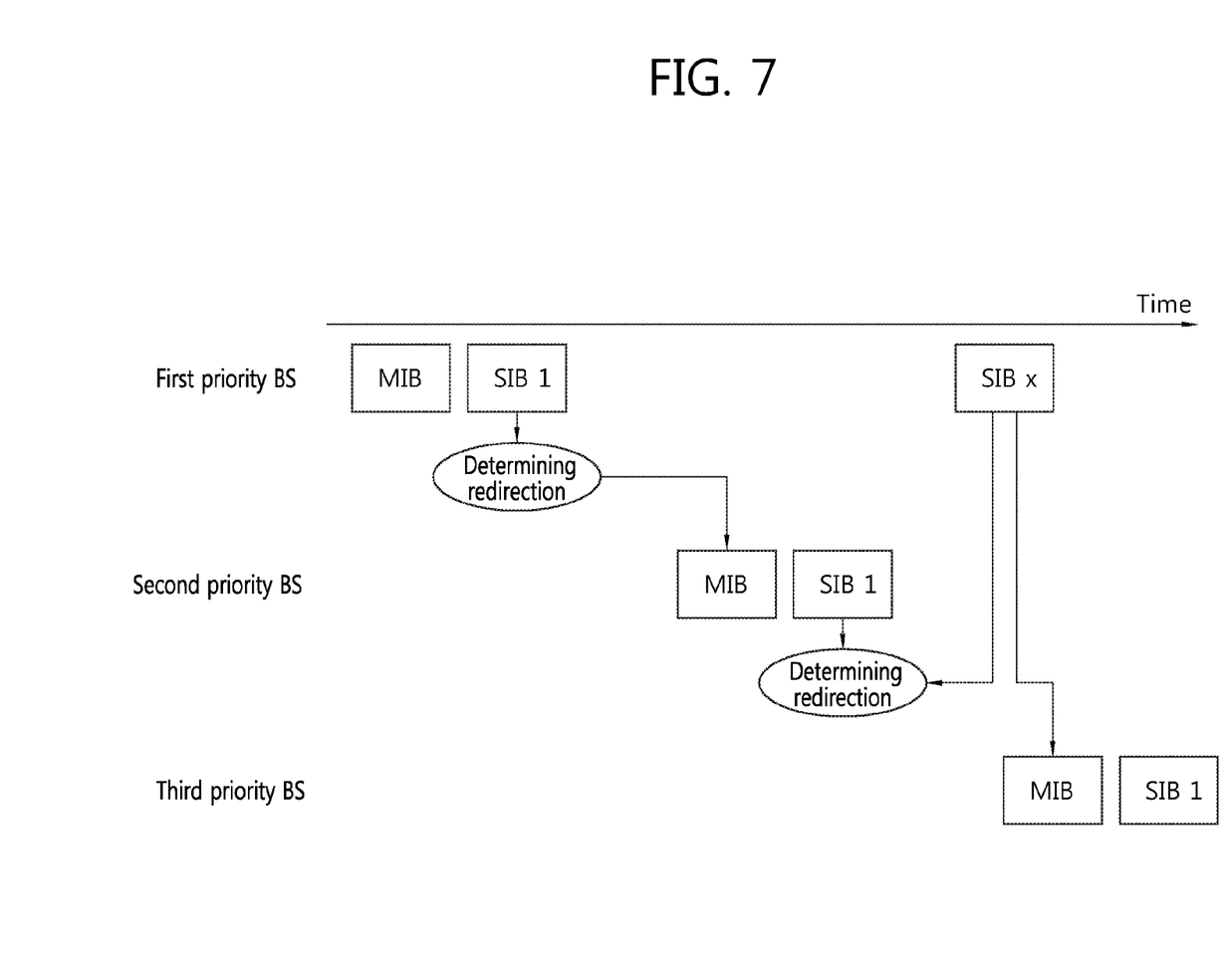
FIG. 7 is a diagram for describing performance of redirection by a UE according to an embodiment of the present invention.

FIG. 7 is a diagram for describing performance of redirection by a UE according to an embodiment of the present invention.

As shown in FIG. 7, a UE may determine whether to access by receiving MIB and SIB 1 from a first priority BS. When the redirection is determined, the UE may determine whether to access by receiving MIB and SIB 1 from a second priority BS and a third priority BS sequentially. That is, the UE may receive SI on the BSs of the next priority reception power.

In addition, since the UE may know the SIB transmission schedule, the UE may preferentially receive the AP information (e.g., SIB x) transmitted from the BS that tries to access previously on the corresponding time.

According to an embodiment of the present invention, after trying to perform the redirection to the wireless node for a cellular access, the UE may try to perform the redirection to the wireless node for a Wi-Fi access. That is, in case that all of the radio accesses by the same RAT are failed, the UE may try to perform the redirection to a wireless node for the Wi-Fi access which is a hetero RAT.

Figure 8:
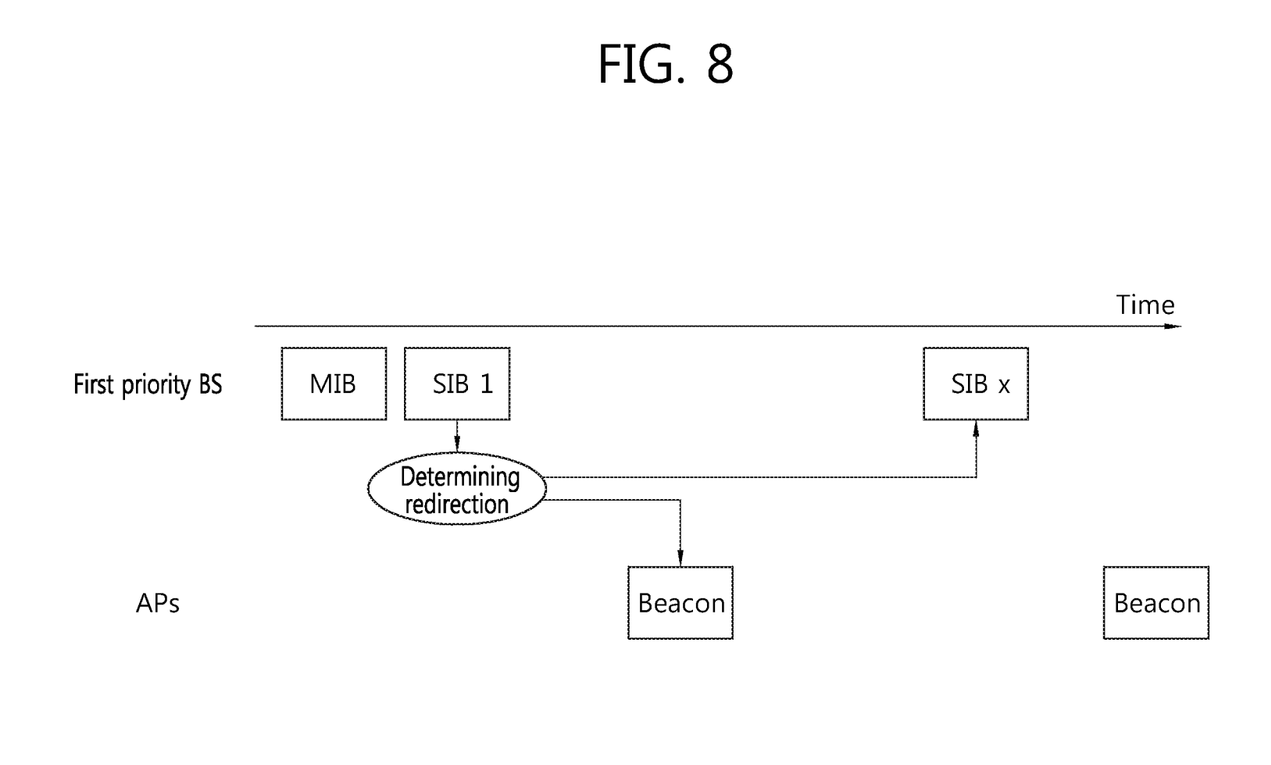
FIG. 8 is a diagram for describing performance of redirection by a UE according to another embodiment of the present invention.

FIG. 8 is a diagram for describing performance of redirection by a UE according to another embodiment of the present invention.

As shown in FIG. 8, when a UE fails to link with a BS that transmits a pilot signal, the UE may try to perform the redirection to a wireless node for a Wi-Fi access after trying to perform the redirection to a wireless node for a cellular access.

At the moment, the redirection to the wireless node for the cellular access and the redirection to the wireless node for the Wi-Fi access may be independently performed.

Or, according to an embodiment of the present invention, the redirection for the next priority BS of FIG. 7 and the redirection for the AP of FIG. 8 may be performed simultaneously.

Figure 9:
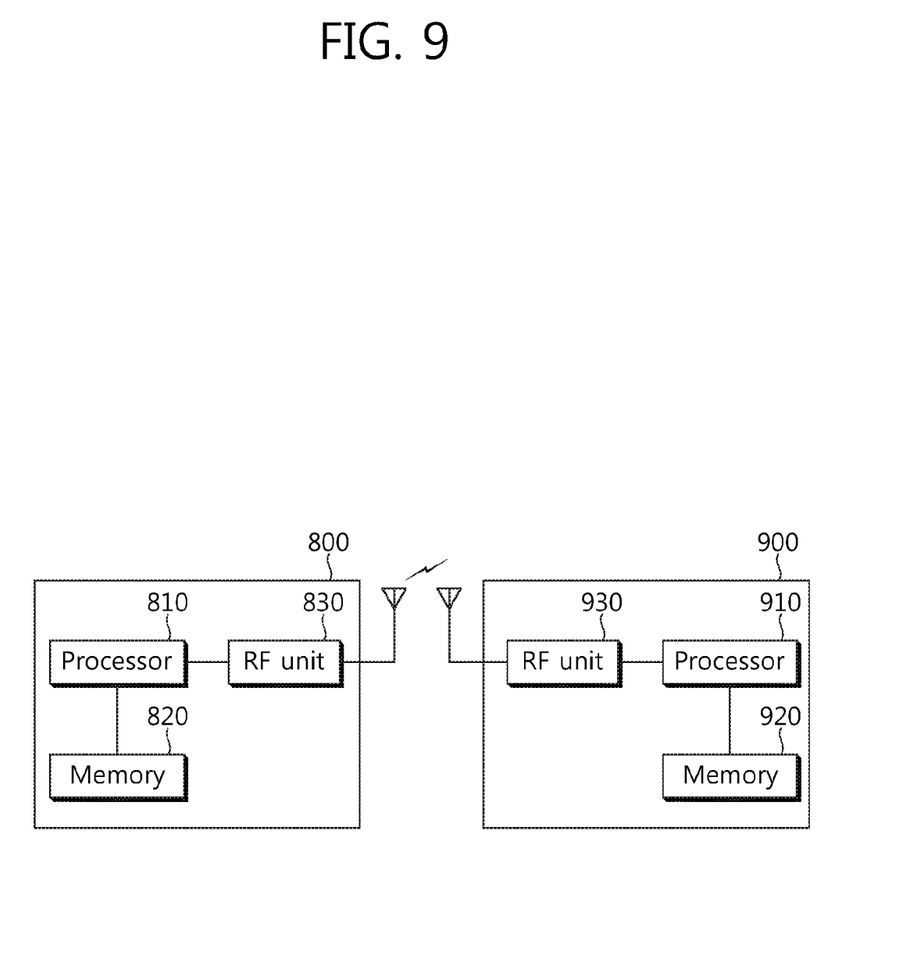
FIG. 9 is a block diagram illustrating a wireless communication system according to an embodiment of the present invention.

FIG. 9 is a block diagram illustrating a wireless communication system according to an embodiment of the present invention.

A BS 800 includes a processor 810, a memory 820, and an RF (radio frequency) unit 830. The processor 810 implements the proposed functions, procedure, and/or methods. The layers of radio interface protocol may be implemented by the processor 810. The memory 820 which is coupled to the processor 810 stores a variety of information for driving the processor 810. The RF unit 830 which is coupled to the processor 810 transmits and/or receives a radio signal. The BS 800 of FIG. 9 may include the cellular BS, the WLAN AP or the RE described above.

A UE 900 includes a processor 910, a memory 920, and an RF (radio frequency) unit 930. The processor 910 implements the proposed functions, procedure, and/or methods. The layers of radio interface protocol may be implemented by the processor 910. The memory 920 which is coupled to the processor 910 stores a variety of information for driving the processor 910. The RF unit 930 which is coupled to the processor 910 transmits and/or receives a radio signal. The UE 900 of FIG. 9 may include the multi-RAT UE described above.

The processor may include Application-Specific Integrated Circuits (ASICs), other chipsets, logic circuits, and/or data processors. The memory may include Read-Only Memory (ROM), Random Access Memory (RAM), flash memory, memory cards, storage media and/or other storage devices. The RF unit may include a baseband circuit for processing a radio signal. When the above-described embodiment is implemented in software, the above-described scheme may be implemented using a module (process or function) which performs the above function. The module may be stored in the memory and executed by the processor. The memory may be disposed to the processor internally or externally and connected to the processor using a variety of well-known means.

As such, the present invention provide a method and apparatus that enables for a UE to select a wireless node for uplink according to a predetermined condition when it is available to perform a radio access through wireless networks different from each other.

In the above exemplary systems, although the methods have been described on the basis of the flowcharts using a series of the steps or blocks, the present invention is not limited to the sequence of the steps, and some of the steps may be performed at different sequences from the remaining steps or may be performed simultaneously with the remaining steps. Furthermore, those skilled in the art will understand that the steps shown in the flowcharts are not exclusive and may include other steps or one or more steps of the flowcharts may be deleted without affecting the scope of the present invention.

What is claimed is:

1. A method for performing cellular access in a multi-radio access technologies environment in which uplink and downlink coverage is asymmetric, the method performed by a user equipment (UE) and comprising:
receiving first system information related to pilot transmission power and permissible uplink reception power from a base station (BS);
estimating an amount of path loss based on the received pilot transmission power and measured pilot reception power; and
accessing the BS or a wireless node different than the BS based on the received permissible uplink reception power and the estimated amount of path loss,
wherein the BS is accessed if a value obtained by subtracting the estimated amount of path loss from a maximum transmission power is greater than the received permissible uplink reception power, and
wherein the maximum transmission power is a smaller of a UE maximum transmission power and a UE maximum permissible transmission power.

2. The method of claim 1, further comprising:
determining not to access the BS if the obtained value is less than the received permissible uplink reception power; and
receiving second system information from the wireless node different than the BS if it is determined not to access the BS.

3. The method of claim 2, wherein
the wireless node different than the BS is used for the cellular access or WiFi.

4. A user equipment (UE) for performing cellular access in a multi-radio access technologies environment in which uplink and downlink coverage is asymmetric, the UE comprising:
a signal transmitting and receiving unit configured to transmit and receive signals; and
a processor connected to the signal transmitting and receiving unit
and configured to:

receive first system information related to pilot transmission power and permissible uplink reception power from, a base station (BS);

estimate an amount of path loss based on the received pilot transmission power and measured pilot reception power; and access the BS or a wireless node different than the BS based on the received permissible uplink reception power and the estimated amount of path loss, wherein the BS is accessed if a value obtained by subtracting the estimated amount of path loss from a maximum transmission power is greater than the received permissible uplink reception power, and wherein the maximum transmission power is a smaller of a UE maximum transmission power and a UE maximum permissible transmission power.

5. The user equipment of claim 4, wherein the processor is further configured to:

determine not to access the BS if the obtained value is less than the received permissible uplink reception power; and receive second system information from the wireless node different than the BS if it is determined not to access the BS.

6. The user equipment of claim 5, wherein the wireless node different than the BS is used for the cellular access or WiFi access.

* * * * *